Aug. 23, 1938.   F. L. ALBEN   2,128,066
RAILWAY LOCOMOTIVE
Filed Nov. 13, 1935
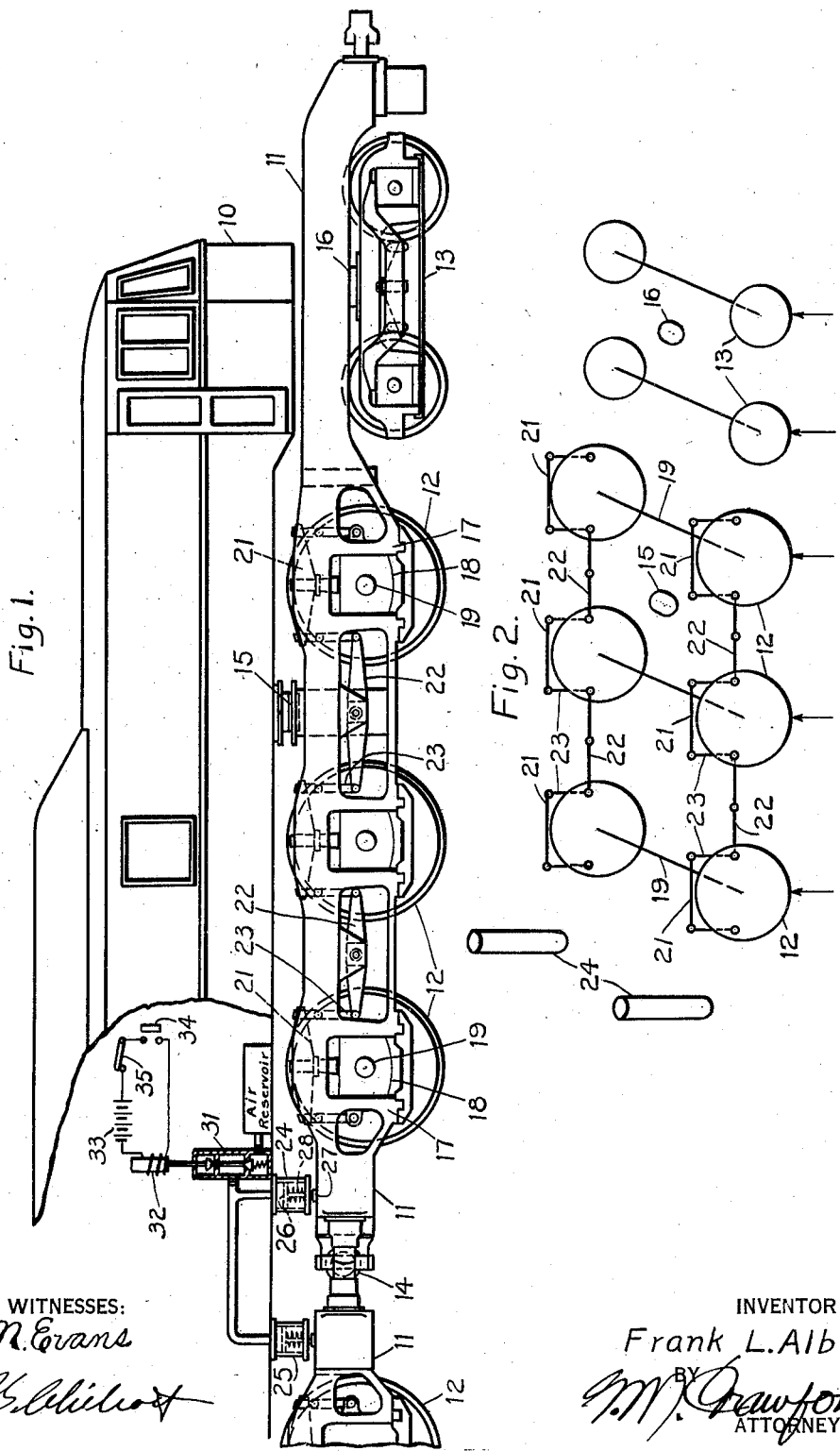
INVENTOR
Frank L. Alben.

Patented Aug. 23, 1938

2,128,066

UNITED STATES PATENT OFFICE 2,128,066

RAILWAY LOCOMOTIVE

Frank L. Alben, Pittsburgh, Pa., assignor to Westinghouse Electric & Manufacturing Company, East Pittsburgh, Pa., a corporation of Pennsylvania Application November 13, 1935, Serial No. 49,510

5 Claims. (Cl. 105—75)

My invention relates, generally, to railway locomotives, and, more particularly, to electric locomotives designed for high speed operation.

When operating electric locomotives which are designed for high speed operation, it is desirable to be able to transfer weight from the guiding trucks to the driving wheels during starting in order to develop a greater starting tractive effort. As the speed increases, the weight must be transferred back to the guiding trucks in order to obtain the proper tracking characteristics for high speed operation.

The copending application of W. A. Brecht, Serial No. 49,511, filed November 13, 1935, describes and claims a system for transferring weight from the guiding trucks to the driving wheels of an electric locomotive wherein the cab is rigidly connected to the locomotive frame and one or more of the guiding trucks is connected to the driver system through equalizers. The present application relates to locomotives of the truck type wherein the locomotive cab is not rigidly connected to the main frame of the locomotive.

An object of my invention, generally stated, is to provide an electric locomotive which shall be simple and efficient in operation and which may be economically manufactured and installed.

A more specific object of my invention is to increase the weight on the driving wheels of an electric locomotive during starting.

Another object of my invention is to provide for readily transferring weight from the guiding trucks to the driving wheels in order to increase the starting tractive effort of an electric locomotive.

Other objects of my invention will be explained fully hereinafter or will be apparent to those skilled in the art.

In accordance with the present invention, air cylinders, each one of which contains a piston, are attached to the locomotive cab which rests on the truck center pins. By admitting air to the cylinders under pressure the pistons are forced against the locomotive frame in such a manner that a part of the weight normally carried by the guiding trucks is transferred to the driving wheels, thereby increasing their traction on the rails. If desired the cylinders may be located on the truck frames and the pistons forced against the cab to accomplish the same result. The admission of air pressure to the cylinders may be controlled by suitable magnet valves, or other suitable means, and the operation of the valves may be so coordinated with the locomotive control system that the weight carried by the driving wheels is increased only during the starting of the locomotive.

For a fuller understanding of the nature and objects of the invention reference may be had to the following detailed description, taken in conjunction with the accompanying drawing, in which:

Figure 1 is a view, in side elevation, of a portion of an electric locomotive embodying my invention, and Fig. 2 is a diagrammatic view of the weight transfer system utilized in the structure shown in Fig. 1.

Referring now to the drawing, the locomotive illustrated comprises a cap 10, a frame structure 11, driving wheels 12 and guiding trucks 13, only one of which is shown. The locomotive is of the articulated type, the two sections of the frame being joined by a mallet hinge 14. The weight of the cab 10 is normally carried on two center pins 15, one of which is located midway between the first and second driver of each section of the main frame. Similar center pins 16 are provided on the guiding trucks 13 for supporting the ends of the locomotive frame 11.

The frame 11 is provided with the usual pedestals 17, adapted to receive journal boxes 18 in which the driving wheel axles 19 are rotatably mounted. The driving wheels may be propelled by electric motors (not shown) in any suitable manner.

Each section of the locomotive is provided with a side spring equalization system, as illustrated diagrammatically in Fig. 2, the mechanism being the same on both sections. As shown in Fig. 1 the equalizing mechanism for one side of one section of the locomotive comprises springs 21, one of which is mounted on top of each of the journal boxes 18 and equalizer arms 22 which are connected to the springs 21 by hanger straps 23. The equalizer bars 22 are pivotally connected to the frame 11 at their midpoints and each end of the equalizing system is anchored to the frame 11. As stated hereinbefore, the equalizing mechanism shown is duplicated on the other side of the locomotive.

The normal division of load between the guiding trucks 13 and the drivers 12 depends upon the longitudinal location of the center pins 15 and the cab 10. By shifting the center pins 15 toward the middle of the locomotive, weight is taken from each of the guiding trucks and added to the driving wheels.

The invention disclosed in the present application provides a means whereby the operator of a locomotive can cause weight to be transferred between the guiding trucks and the driving wheels when desired. In this manner the tractive effort of the driving wheels may be increased for starting the locomotive, thereby taking advantage of the short time overload capacity of the propelling motors, and the proper distribution of weight provided for high speed operation.

As shown, a pair of cylinders 24 are secured to the bottom of the cab 10. The cylinders 24 are disposed between the cab 10 and the frame 11 just in front of the mallet hinge 14, which joins the two sections of the locomotive frame. Similar cylinders 25 are disposed just back of the mallet hinge to transfer weight to the drivers of the rear truck of the locomotive in the manner herein described. If desired only one cylinder may be provided for each truck, in which case it should be located on the longitudinal center line of the locomotive.

A piston 26 is disposed inside of the cylinder 24 to force a plunger 27 against the frame 11 when air, or other fluid pressure, is applied to the piston. A spring 28 is provided inside of the cylinder 24 to raise the piston 26 when the fluid pressure is released. The other cylinders are constructed in the same manner as the cylinder 24.

It will be readily seen that the pressure applied on the frame 11 by the plungers will increase the weight on the driving wheels and decrease the weight on the guiding trucks 13, thereby increasing the traction of the driving wheels on the rails. In this manner weight may be temporarily transferred from the guiding trucks to the driving wheels, the effect being the same as would be accomplished by moving the center pins 15 toward the middle of the locomotive. After the locomotive has started the train a high tractive effort is no longer required and the fluid pressure may be released from the cylinders to permit proper distribution of the load on the guiding trucks and the driving wheels for high speed operation.

In order that the operation of the weight transfer device may be coordinated with the control system for the locomotive, an electrically operated fluid valve 31 may be provided for controlling the admission of the pressure fluid to the cylinders 24 and 25. The fluid valve 31 is operated by a solenoid coil 32 that may be energized from a battery 33. The energizing circuit is established by closing a switch 34 which may be a contact segment on the master controller for the locomotive.

The contact segment 34 may be so located on the controller that the weight transfer device will function only during the starting of the locomotive, thereby insuring that normal weight will be restored on the guiding trucks after the locomotive is started. An additional cut-out switch 35 may be provided to prevent operation of the weight transfer device when it is not required or desired.

If desired, another fluid valve (not shown) similar to the valve 31, may be provided for controlling the operation of the pistons on the other side of the locomotive and the electrical circuits so connected that the pistons will all be operated simultaneously. Or the cylinders may all be connected to the one fluid valve in a manner similar to that illustrated.

From the foregoing description, it is apparent that I have provided a simple and effective means for transferring weight from the guiding trucks to the driving wheels of a locomotive of the truck type in order to increase the starting tractive effort of the locomotive. Furthermore, it is evident that the device herein described may be readily applied to a locomotive structure.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a railway locomotive, in combination, a locomotive frame, a locomotive cab, a plurality of driving wheels at each side of the locomotive, an equalizing system on each side of the frame for distributing the weight carried by the driving wheels, a guiding truck disposed independently of the driving wheels and the equalizing system for normally carrying a predetermined part of the locomotive weight, and means acting between the cab and the frame for applying pressure directly on the locomotive frame independently of the equalizing system to transfer weight from the guiding truck to the driving wheels, said locomotive cab being normally supported on the frame at a point between the guiding truck and the point of applying said pressure.

2. In a railway locomotive, in combination, a locomotive frame, a locomotive cab, a plurality of driving wheels at each side of the locomotive, an equalizing system on each side of the frame for distributing the weight carried by the driving wheels, a guiding truck disposed independently of the driving wheels and the equalizing system for normally carrying a predetermined part of the locomotive weight, and means acting between the cab and the frame for applying pressure directly on the locomotive frame independently of the equalizing system to transfer weight from the guiding truck to the driving wheels during starting of the locomotive, said cab being normally supported on the frame at a point between the guiding truck and the point of applying pressure.

3. In a railway locomotive, in combination, a locomotive frame, a locomotive cab, a plurality of driving wheels at each side of the locomotive, an equalizing system on each side of the frame for distributing the weight carried by the driving wheels, a guiding truck disposed independently of the driving wheels and the equalizing system for normally carrying a predetermined part of the locomotive weight, and means acting between the cab and the frame for applying pressure directly on the locomotive frame independently of the equalizing system to transfer weight from the guiding truck to the driving wheels temporarily while the locomotive is in operation, said cab being normally supported on the frame at a point between the guiding truck and the point of applying pressure.

4. In a railway locomotive, in combination, a locomotive cab, a frame structure, a center pin in said frame for normally supporting said cab, a plurality of driving wheels at each side of the locomotive, an equalizing system on each side of the frame for distributing the weight carried by the driving wheels, a guiding truck for supporting one end of the frame independently of the driving wheels, and means disposed between the cab and the frame for applying pressure directly on the frame independently of the equalizing system to transfer weight from the guiding truck to the driving wheels, said center pin being disposed between said guiding truck and the point of applying said pressure.

5. In a railway locomotive, in combination, a locomotive cab, a frame structure, a center pin in said frame for normally supporting said cab, a plurality of driving wheels at each side of the locomotive, an equalizing system on each side of the frame for distributing the weight carried by the driving wheels, a guiding truck for supporting one end of the frame independently of the driving wheels, and fluid-pressure operated means disposed between the cab and the frame for applying pressure directly on the frame independently of the equalizing system to transfer weight between the guiding truck and the driving wheels temporarily while the locomotive is in operation, said center pin being disposed between said guiding truck and the point of applying said pressure.

FRANK L. ALBEN.